(12) United States Patent
Ramu et al.

(10) Patent No.: US 8,925,071 B2
(45) Date of Patent: Dec. 30, 2014

(54) GEOMETRICAL PATTERN BASED APPLICATION PASSCODE

(71) Applicants: Gowda Timma Ramu, Bangalore (IN); Shweta Arunkumar Bodade, Bangalore (IN); Raghuraman Ramakrishnan, Bangalore (IN); Ashutosh Rastogi, Bangalore (IN)

(72) Inventors: Gowda Timma Ramu, Bangalore (IN); Shweta Arunkumar Bodade, Bangalore (IN); Raghuraman Ramakrishnan, Bangalore (IN); Ashutosh Rastogi, Bangalore (IN)

(73) Assignee: Business Objects Software Limited, Dublin (IE)

( * ) Notice: Subject to any disclaimer, the term of this patent is extended or adjusted under 35 U.S.C. 154(b) by 175 days.

(21) Appl. No.: 13/712,932

(22) Filed: Dec. 12, 2012

(65) Prior Publication Data

US 2014/0165186 A1    Jun. 12, 2014

(51) Int. Cl.
| | | |
|---|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| G06F 21/31 | (2013.01) |

(52) U.S. Cl.
CPC .................................... *G06F 21/31* (2013.01)
USPC .................................. 726/19; 726/2; 726/16

(58) Field of Classification Search
CPC ........................................................ G06F 21/36
USPC ............................................ 726/19; 715/863
See application file for complete search history.

(56) References Cited

U.S. PATENT DOCUMENTS

| | | | |
|---|---|---|---|
| 8,504,842 B1 * | 8/2013 | Meacham ..................... 713/183 |
| 2008/0141362 A1 | 6/2008 | Torres et al. |
| 2010/0031200 A1 | 2/2010 | Chen |
| 2012/0056827 A1 * | 3/2012 | Kim et al. ..................... 345/173 |
| 2013/0229367 A1 * | 9/2013 | Pinch ............................. 345/173 |
| 2014/0013414 A1 * | 1/2014 | Bruck ............................ 726/16 |

* cited by examiner

*Primary Examiner* — Andrew Nalven
*Assistant Examiner* — Khang Do (57) ABSTRACT

To authorize an access to an application, a user interface renders a geometrical pattern on receiving a trigger to access the application. The rendered geometrical pattern includes an instance of an arrangement of one or more first nodes and one or more second nodes. The rendered geometrical pattern is associated with an input type to receive a selection of the first nodes and the second nodes. The selection of the first nodes and the second nodes is received as an authorizing key. The authorizing key is matched with an authorizing passcode stored in memory to provide access to the application.

17 Claims, 9 Drawing Sheets

GEOMETRICAL PATTERN BASED APPLICATION PASSCODE

BACKGROUND

Portable electronic devices include customized applications that may be operable to access and store information on them. This information may include personal or enterprise information like electronic mails, confidential enterprise data, etc. Unauthorized access to such information may be prevented by customizing a password or a passcode to access the applications. Conventional password schemes include presenting on a touch screen generic numeric keypad layouts to enter numeric characters or a static grid of nodes to enter a visual pattern as the password. Therefore, conventional password schemes are vulnerable to be hacked. Hence there is a need for a password scheme that is not vulnerable to be hacked.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for systems and methods for geometrical pattern based application passcode generation are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A multifunction electronic device (MED), herein referred to as a "mobile device", may include a handheld computing device, an enterprise digital assistant (EDA), a personal digital assistant (PDA), a tablet computer, a smartphone, an internet appliance, and the like. The mobile device includes a memory (for e.g. flash memory, memory card and the like) for storing data, and a touch screen to display and enable user interaction. The mobile device can access internet services such as World Wide Web (www) or electronic mails (E-mails), and exchange information with a general purpose computer by using known wired or wireless technologies (for e.g. Bluetooth, Wi-Fi, Universal Serial Bus (USB), infrared and the like). The mobile device accesses information and data using internet services, which is provided for consumption through mobile applications.

Mobile applications, herein referred to as "app" or "apps" are customized software applications developed to be deployed or installed on the mobile devices. Apps may be developed and distributed through application distribution platforms owned by mobile operating system providers or corporate enterprises to provide access to data on the go. The data accessible through apps may include personal data, business or corporate related data including contacts, e-mails, calendar, subscriptions to journal and magazine, publications, and the like. These apps can be configured to download data on the mobile device and stored in memory.

The data stored on the mobile device may include confidential and privileged information. Such confidential and privileged information may need to be provided with access restrictions to prevent unauthorized use. Access restrictions can be provided by configuring the app with an authorizing mechanism. The authorizing mechanism includes configuring the app with an authorizing passcode, and storing the authorizing passcode in the memory of the mobile device. On triggering the app, the authorizing mechanism provides a user interface (UI) that renders a geometrical pattern including an instance of arrangement of a plurality of nodes. The nodes may be associated with distinct values. In an embodiment, a type of the rendered geometrical pattern is associated with a unique input type to receive a selection of the nodes. The selection of nodes is received as an authorizing key and the access to the app is authorized by matching the authorizing key with the authorizing passcode stored in the memory. In an embodiment, this authorizing mechanism is used to lock and/or un-lock an application, a service and a system (or a device). The authorizing mechanism may include a process or a program containing a sequence of instructions that are executed by a processor of an associated computer.

Figure 1A:
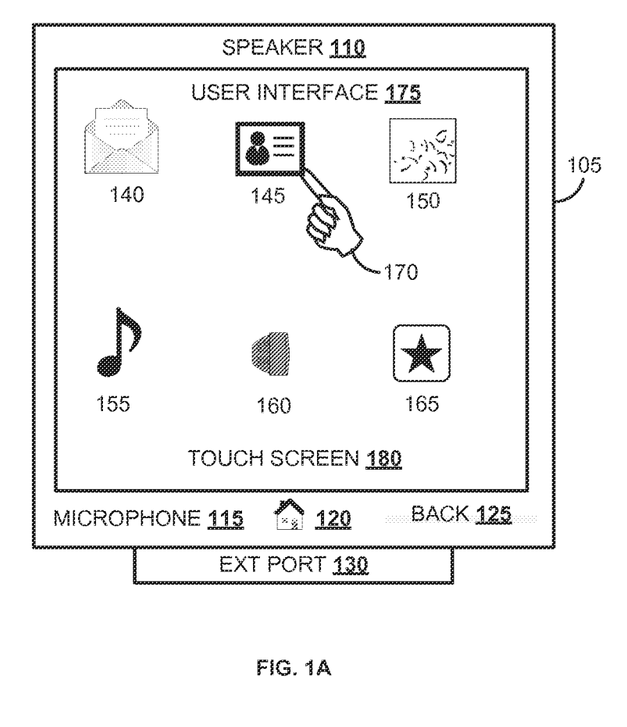
FIG. 1A is an exemplary illustration of a multifunction electronic device having a touch screen, according to an embodiment.

FIG. 1A is an exemplary illustration of a multifunction electronic device having a touch screen, according to an embodiment. A mobile device 105 representing the multifunction electronic device has a touch screen 180. The touch screen 180 enables user interaction with the mobile device 105 and displays a list of apps 140, 145, 150, 155, 160, 165 available on a user interface (UI) 175. In an embodiment, the user interacting with the mobile device 105 via the touch screen 180 may trigger one such app 145 by a gesture. The gesture may include a swipe gesture (for e.g. left to right, right to left, upward, downward, or a combination thereof), one or more tap gestures, rolling of a finger (for e.g. left to right, right to left, upward and/or downward or a combination thereof) and the like. The app 145 is configured to access data using internet services or download data on the mobile device 105. The data stored on the mobile device 105 may include confidential and privileged information and may need access restrictions to prevent from misuse. Access to data is restricted by configuring the app 145 with an authorizing mechanism. The authorizing mechanism includes customizing the app 145 with an authorizing passcode. The authorizing passcode may be stored in the memory of the mobile device 105. In an embodiment, the app 145 may be configured with an authorizing passcode the first time the app 145 is accessed. In another embodiment, the app 145 may provide a UI 185 to configure the authorizing passcode during subsequent access of the app 145 based on a user interest.

Figure 1B:
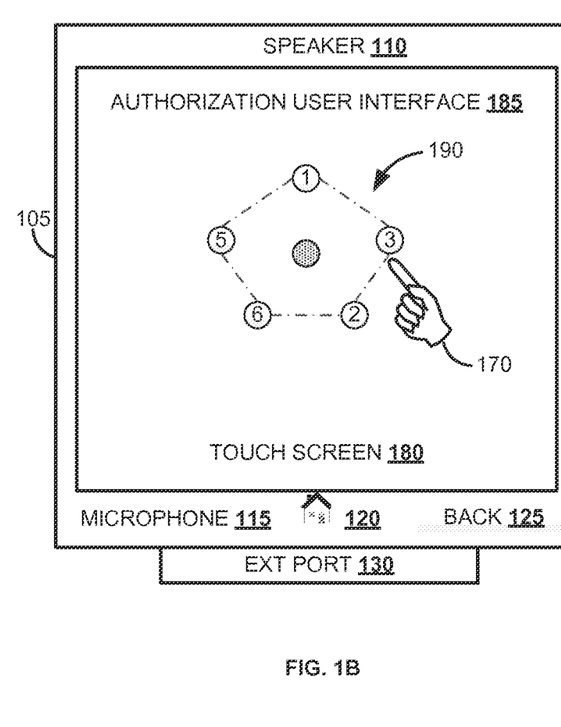
FIG. 1B is an exemplary illustration of an authorization user interface rendering a geometrical pattern on a multifunction electronic device, according to an embodiment.

FIG. 1B is an exemplary illustration of an authorization user interface rendering a geometrical pattern on a multifunction electronic device, according to an embodiment. In an embodiment, on triggering the app 145, the UI 185 renders a geometrical pattern 190 representing an instance of an arrangement of a plurality of first nodes and a plurality of second nodes. For the rendered geometrical pattern 190, each instance of the arrangement of the first nodes and the second nodes is distinct. For example, on triggering the app 145 for a first time, the UI 185 renders the geometrical pattern 190 with a first instance of the arrangement of the first nodes and the second nodes. Similarly, on triggering the app 145 for a second time, the UI 185 renders a geometrical pattern 190 with a second instance of the arrangement of the first nodes and the second nodes. In a similar manner, for each trigger to access the app 145, the UI 185 renders the geometrical arrangement 190 with a distinct instance of the arrangement of the first nodes and the second nodes.

In an embodiment, the rendered geometrical pattern 190 is associated with an input type to receive a user selection of the first nodes and the second nodes. In an embodiment, the input type may include a swipe gesture, one or more tap gestures, a drag-and-drop gesture, or the like. A drag gesture of the drag-and-drop gesture includes additional attributes like a direction of movement, for example a clockwise direction, a counter clockwise direction, an angular direction, a linear direction, or a combination thereof. In an embodiment, for each instance of the arrangement, each first node is associated with a distinct value, for example numeric, alphanumeric, an alphabet character or the like. Each second node may be configured to include a distinct value or a function, and is based on the rendered geometrical pattern. For instance, the second nodes may be configured to include a null value, or configured as a drop zone, or configured to include distinct patterns, colors, semantically distinct characters, or a combination thereof.

In an embodiment, based on the corresponding input type, the user selection of first nodes and the second nodes is received as an authorizing key. The authorizing key is received and stored in a data structure. The authorizing key is compared with the authorizing passcode to find a correlation between each other. If the authorizing key matches the authorizing passcode, the access to the app 145 is authorized, and the user is allowed to access the app 145. If the authorizing key fails to match the authorizing passcode, the UI 185 renders the geometrical pattern 190 with another instance of the arrangement of the first nodes and the second nodes.

In an embodiment, upon a mismatch between the authorizing key and the authorizing passcode, the authorizing mechanism repeats rendering the geometrical pattern 190 with distinct instances of the arrangement of the first nodes and the second nodes for a determined number of times, for example three. Upon exceeding the determined number of times of rendering the geometrical pattern 190 for a mismatch, the authorizing mechanism may prevent access to the app 145 by locking the app 145. In another embodiment, upon exceeding the determined number of times of rendering the geometrical pattern 190 for the mismatch, the authorizing mechanism deletes the data associated with the app 145 from the memory of the mobile device 105. In another embodiment, on receiving the trigger to access the app 145, the UI 185 may render a randomly selected geometrical pattern 190 from the plurality of geometrical patterns. Each geometrical pattern includes a plurality of instances of arrangements of the first nodes and the second nodes.

Figure 2:
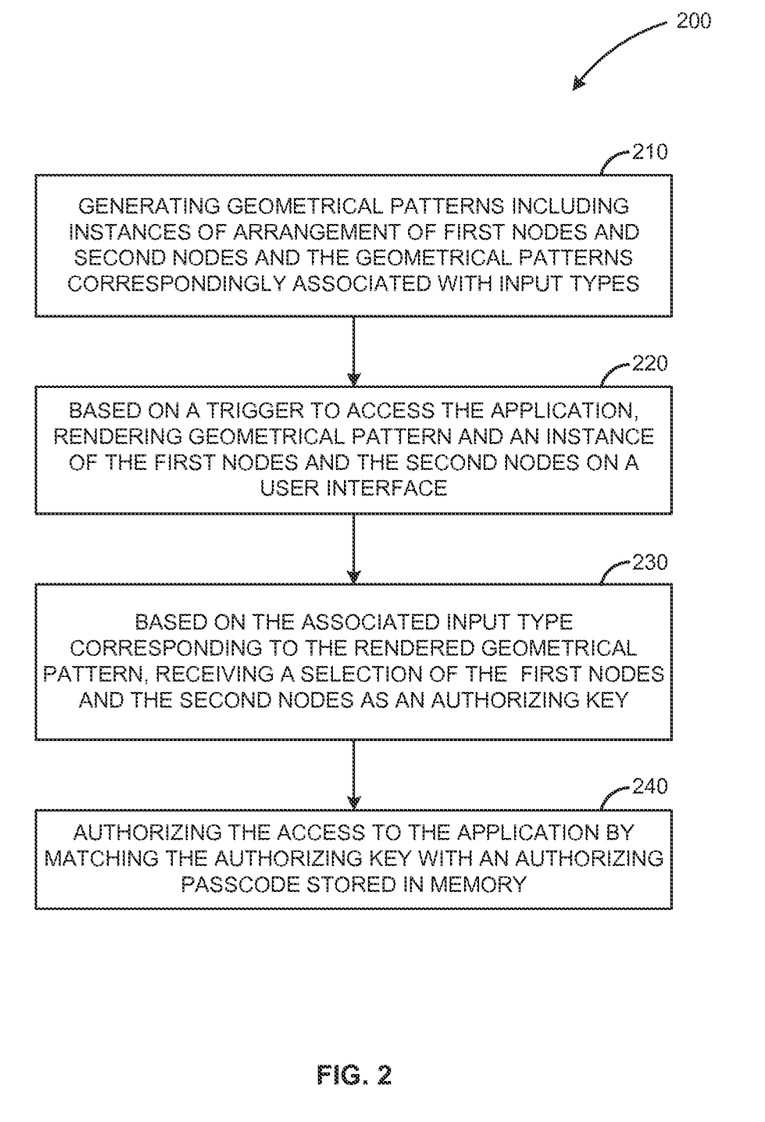
FIG. 2 is a flow diagram illustrating of a method for authorizing access to an application, according to an embodiment.

FIG. 2 is a flow diagram illustrating of a method for authorizing access to an application, according to an embodiment. In an embodiment, a method to authorize access to an application includes generating a plurality of geometrical patterns at process block 210. The geometrical patterns are correspondingly associated with a plurality of input types and include a plurality of instances of an arrangement of a plurality of first nodes and a plurality of second nodes. At process block 220, based on a trigger to access an app, a user interface renders the geometrical pattern including an instance of the arrangement of the first nodes and the second nodes. At process block 230, based on an input type associated with the rendered geometrical pattern, a selection of the first nodes and the second nodes is received to generate an authorizing key. The access to the app is authorized by matching the authorizing key with an authorizing passcode stored in a memory, at process block 240.

Figure 3A:
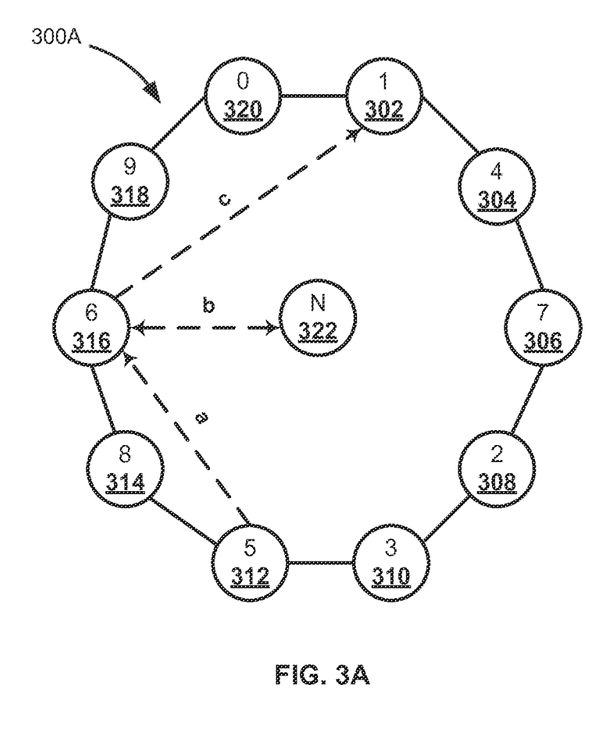
FIG. 3A is an exemplary illustration of a user interface rendering a decagon pattern with a first instance of arrangement of first nodes and second node, according to an embodiment.

FIG. 3A is an exemplary illustration of a user interface rendering a decagon pattern with a first instance of arrangement of first nodes and second node, according to an embodiment. A mobile device 105 may display a list of available apps 140, 145, 150, 155, 160 and 165 on a user interface (UI) 175. A user interacting with the mobile device 105 via a touch screen 180 may trigger one such app 150 by a gesture. On receiving a trigger to access the app 150, an authorizing mechanism of the app 150 renders a geometrical pattern 300A on the UI 185. The rendered geometrical pattern 300A includes a first instance of an arrangement of a first set of nodes including a plurality of first nodes 302, 304, 306, 308, 310, 312, 314, 316, 318 and 320 and a second set of nodes including a second node 322. The first nodes are arranged as vertices of an n-sided polygon, for instance a ten-sided decagon. The second node may be positioned such that it is accessible from the first nodes. In another embodiment, the first nodes are arranged along a plurality of sides of an h-sided polygon. The first nodes are correspondingly associated with a numeric value and the second node is associated with a null character representing a NULL value.

In an embodiment, the input type corresponding to the decagon pattern includes, for example a swipe gesture. The swipe gesture enables a user to select the first nodes and the second node without lifting a finger 170 or a stylus (not shown in the figure), or any such navigation tool (not shown in the figure) from the touch screen 180 of the mobile device 105. The selection of the first nodes and the second nodes is received as authorizing key. The authorizing key is then matched with an authorizing passcode stored in the memory of the mobile device 105. On matching the authorizing key with the authorizing passcode, the access to the app is authorized.

In an embodiment, the selection of second node enables the user to repeat selection of the first nodes in succession, without lifting their finger 170 or the stylus (not shown in the figure) from the UI 175. For example, consider an authorizing key to be entered by a user includes '5661'. The user selects a first node with value '5' 312, and a first node with value '6' 316. Since the first node with value '6' 316 repeats in succession, the user selects the second node 322 and then selects a first node with value '6' 316. In this manner, the user is able to repeat selecting the first node in succession, by selecting the second node in between the successive selections of the first node. The user may further select the first node with value '1' 302 to complete the selection of the first nodes 312, 316, 316 and 302 which is received as the authorizing key. The user selection of the above first nodes are shown in FIG. 3A, by arrows a, b, and c. All the above selections of the first and the second nodes are executed by swiping on the touch screen 180 of the mobile device 105, without lifting the navigation tool (for e.g. finger 170, stylus (not shown in the figure), or the like).

Figure 3B:
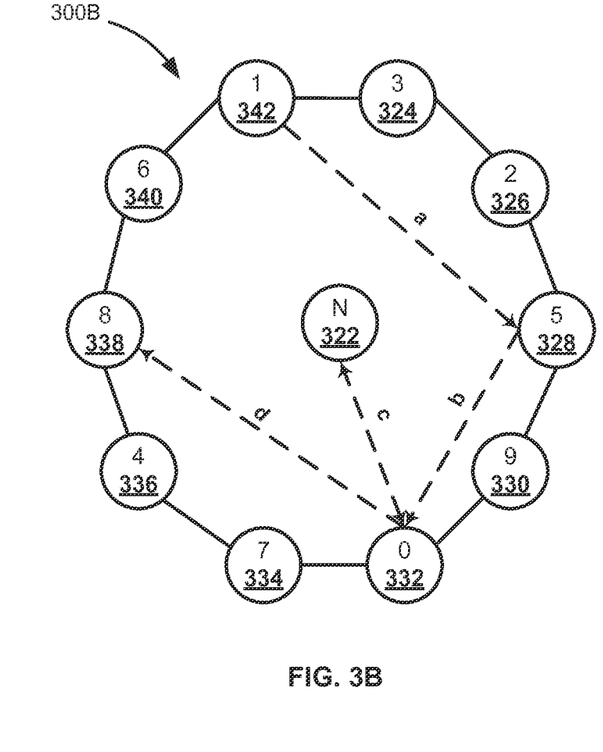
FIG. 3B is an exemplary illustration of a user interface rendering a decagon pattern with a second instance of an arrangement of first nodes and second node, according to an embodiment

In an embodiment, the user selection of the first nodes and the second nodes by the swipe gesture creates a visual swipe-pattern. The authorizing mechanism interprets the selection of values of the first nodes and the second node as the authorizing key, and not the swipe-pattern itself. In an embodiment, the visual swipe-pattern of the selection the first nodes and the second node is dynamic and is based on the instance of the arrangement of the first nodes and the second node for the rendered decagon pattern 300A on the UI 185. For example, at a first instance, the arrangement of the first nodes 302, 304, 306, 308, 310, 312, 314, 316, 318 and 320 respectively represent the values 1, 4, 7, 2, 3, 5, 8, 6, 9, and 0, as shown in FIG. 3A; at a second instance, the arrangement of the first nodes 324, 326, 328, 330, 332, 334, 336, 338, 340 and 342 respectively represent the values 3, 2, 5, 9, 0, 7, 4, 8, 6, and 1, as shown in FIG. 3B. Hence, the swipe-pattern for each instance of the arrangement of the first nodes and the second nodes 322 for the rendered geometrical pattern 300A is distinct and is not vulnerable to be easily interpreted by another user, thus making the authorizing mechanism robust.

FIG. 3B is an exemplary illustration of a user interface rendering a decagon pattern with a second instance of an arrangement of first nodes and second node, according to an embodiment. In an embodiment, consider the authorizing passcode for an app 150 that is stored in the memory of the mobile device 105 to be '15008', FIG. 3B shows the decagon pattern 300B with an instance of an arrangement of the first nodes 324, 326, 328, 330, 332, 334, 336, 338, 340 and 342 and the second node 322. The input type corresponding to the decagon pattern includes a swipe gesture, as explained in detailed description of FIG. 3A. To enter the authorizing key for accessing the app 150, a user selects a first node with value '1' 342; subsequently, a first node with value '5' 328; and a first node with value '0' 332. To repeat selecting the first node with value '0' 332, the user selects a second node 322 with value NULL and subsequently selects the first node with value '0' 332; and a first node with value '8' 338. The user selection of the above first nodes are shown in FIG. 3B, by arrows a, b, c and d. The user selection of the first nodes 342, 328, 332, 332 and 338, as explained above, is received as the authorizing key. The authorizing key is matched with the authorizing passcode, as explained in detailed description of FIG. 3A, to authorize access to the app.

Figure 4A:
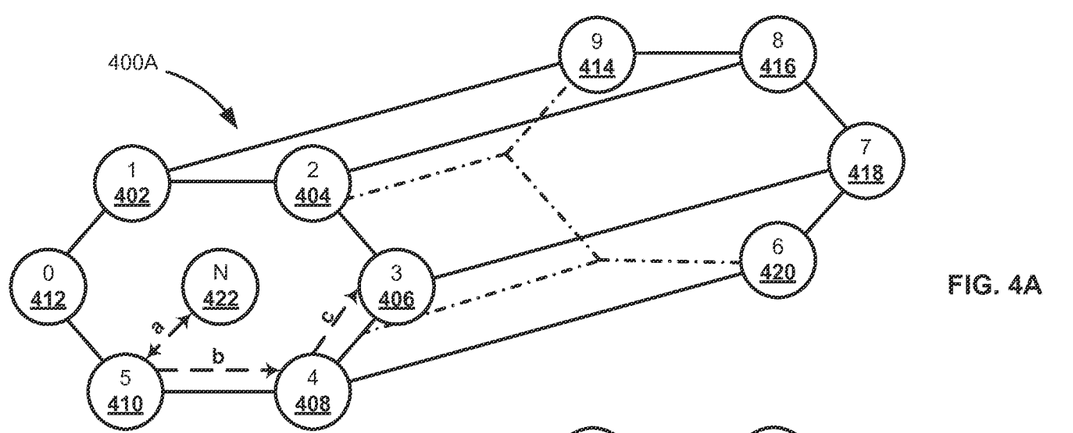
FIG. 4A is an exemplary illustration of a user interface rendering a 3-dimensional hexagonal prism pattern with a first instance of arrangement of first nodes and second node, according to an embodiment.

FIG. 4A is an exemplary illustration of a user interface rendering a 3-dimensional hexagonal prism pattern with a first instance of arrangement of first nodes and second node, according to an embodiment. Upon receiving a trigger to access an app 160, a 3-dimensional (3D) n-sided polyhedron 400A is rendered as the geometrical pattern on a user interface (UI) 185. The rendered geometrical pattern 400A includes a first instance of an arrangement of a first set of nodes including a plurality of first nodes 402, 404, 406, 408, 410, 412, 414, 416, 418 and 420 and a second set of nodes including a second node 422. In an embodiment, the polyhedron 400A illustrated in FIG. 4A represents a six sided hexahedron pattern or a hexagonal prism. The first nodes are arranged as vertices of the hexahedron. The second node is positioned such that it is accessible from the first nodes. The first nodes are correspondingly associated with a numeric value and the second node is associated with a null character representing a NULL value.

In an embodiment, the input type corresponding to the 3-D hexahedron pattern 400A includes a swipe gesture. The swipe gesture enables a user to select the first nodes and the second node 422 without lifting a finger 170 or a stylus (not shown in the figure), or any such navigation tool (not shown in the figure) from the touch screen 180 of the mobile device 105. The selection of the first nodes and the second nodes is received as authorizing key. The authorizing key is then matched with an authorizing passcode stored in the memory of the mobile device. On matching the authorizing key with the authorizing passcode, the access to the app is authorized.

In an embodiment, the selection of second node enables the user to repeat selection of the first nodes in succession, without lifting their finger 170 or the stylus (not shown in the figure) from the UI 185. For example, consider an authorizing key to be entered by a user includes '5543'. The user selects a first node with value '5' 410, and a first node with value '5' 410. Since the first node with value '5' 410 repeats in succession, the user selects the second node 422 and then selects a first node with value '5' 410. In this manner, the user is able to repeat selecting the first node in succession, by selecting the second node in between the successive selections of the first node. The user may further select the first node with value '4' 408 and a first node with value '3' 406 to complete the selection of the first nodes 410, 410, 408 and 406 which are received as the authorizing key. The user selection of the above first nodes are shown in FIG. 4A, by arrows a, b, and c. All the above selections of the first and the second nodes are executed by swiping on the touch screen 180 of the mobile device 105, without lifting the navigation tool (for e.g. finger 170, stylus (not shown in the figure), or the like).

Figure 4B:
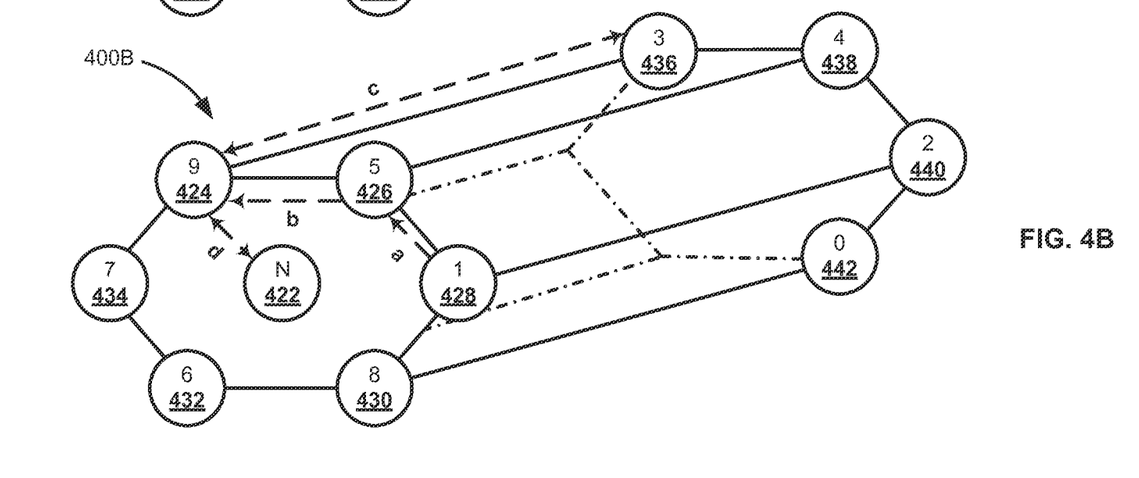
FIG. 4B is an exemplary illustration of a user interface rendering a dimensional hexagonal prism pattern with a second instance of arrangement of first nodes and second node, according to an embodiment.

FIG. 4B is an exemplary illustration of a user interface rendering a 3-dimensional hexagonal prism pattern with a second instance of arrangement of first nodes and second node, according to an embodiment. In an embodiment, consider the authorizing passcode for an app 160 that is stored in the memory of the mobile device to be '159399', FIG. 4B shows the hexagonal prism pattern 400B with an instance of arrangement of the first nodes 424, 426, 428, 430, 432, 434, 436, 438, 440 and 442 and the second node 422. The input type corresponding to the hexagonal prism pattern includes a swipe gesture, as explained in detailed description of FIG. 4A. To enter the authorizing key for accessing the app 160, a user selects a first node with value '1' 428; subsequently, a first node with value '5' 426; a first node with value '9' 424; a first node with value '3' 436; a first node with value '9' 424. To repeat selecting the first node with value '9' 424, the user selects a second node 422 with value NULL and subsequently selects the first node with value '9' 424. The user selection of the above first nodes are shown in FIG. 4B, by arrows a, b, c and d. The user selection of the first nodes 428, 426, 424, 436, 424, and 424, as explained above, is received as the authorizing key. The authorizing key is matched with the authorizing passcode, as explained in detailed description of FIG. 4A, to authorize access to the app.

Figure 5A:
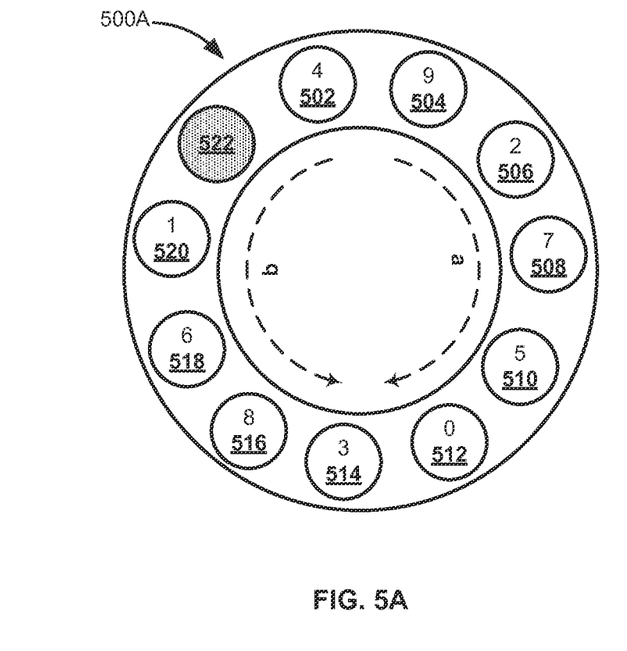
FIG. 5A is an exemplary illustration of a user interface rendering a rotary dial pattern with a first instance of arrangement of first nodes and second node, according to an embodiment.

FIG. 5A is an exemplary illustration of a user interface rendering a rotary dial pattern with a first instance of arrangement of first nodes and second node, according to an embodiment. Upon receiving a trigger to access an app 140, a rotary dial 500A is rendered as the geometrical pattern on the user interface (UI) 185. The rendered rotary dial pattern 500A includes a first instance of an arrangement of a first set of nodes including a plurality of first nodes 502, 504, 506, 508, 510, 512, 514, 516, 518, and 520 and a second set of nodes including a second node 522, all arranged as shown in FIG. 5A. The first nodes are correspondingly associated with a numeric value and the second node is associated with a drop zone. The input type corresponding to the rotary dial geometrical pattern 500A includes a drag-and-drop gesture. A drag gesture of the drag-and-drop gesture enables selecting the first nodes on the UI 185 via a touch screen 180 of the mobile device 105 and a drop gesture enables dropping the selected first nodes at the drop zone 522. The selection of the first nodes by the drag-and-drop gesture is received as the authorizing key. The authorizing key is matched with an authorizing passcode stored in the memory of the mobile device. On matching the authorizing key with the authorizing passcode, the access to the app is authorized.

In an embodiment, the drag gesture for the rotary dial pattern 500A may include a first direction and a second direction of movement along the rotary dial. For instance, the drag gesture includes selecting a first node on the UI 185 via the touch screen 180, and dragging the selected first node along the rotary dial 500A in the first direction, for example clockwise direction (shown by arrow 'a') and dropping the selected first node at the drop zone 522. In another embodiment, the drag gesture includes selecting the first node on the UI 185 via the touch screen 180, and dragging the selected first node along the rotary dial 500A in the second direction, for example counter clockwise direction (shown by arrow 'b'), and dropping the first node at the drop zone 522. In an embodiment, upon the user selection of the first node, the value of the first node is blurred until the drop gesture is completed. Upon completion of the drop gesture to drop the selected first node, the value associated with the first node re-appears on the DT 185.

For example, consider the authorizing passcode for an app that is stored in the memory of the mobile device 105 to be '56673'. Each value of the authorizing passcode may be configured with a direction of movement. For example, for the authorizing passcode above, a first node with value '5' 510 is configured with clockwise direction of movement; a first node with value '6' 518 is configured with counter clockwise direction of movement; a first node with value '6' 518 is configured with clockwise direction of movement; a first node with value '7' 508 is configured with counter clockwise direction of movement and the first node with value '3' 514 is configured with counter clockwise direction of movement. To enter the authorizing key for accessing the app, the user selects a first node with value '5' 510 on the UI 185 via a touch screen 180, and drags the selected first node 510 in a clockwise direction along the rotary dial (indicated by arrow 'a') and drops the selected first node 510 at the drop zone 522. Subsequently, a first node with value '6' 518 is selected, dragged in a counter clockwise direction along the rotary dial (indicated by arrow t') and dropped at the drop zone 522; a first node with value '6' 518 is selected, dragged in a clockwise direction along the rotary dial (indicated by arrow 'a') and dropped at the drop zone 522; a first node with the value '7' 508 is selected, dragged in a counter clockwise direction along the rotary dial (indicated by arrow 'b') and dropped at the drop zone 522; and a first node with value '3' 514 is selected, dragged in a counter clockwise direction along the rotary dial (indicated by arrow 'b') and dropped at the drop zone 522. The drag gesture including a combination of the values and the direction of movement of the first nodes 510, 518, 518, 508 and 514 of the drag-and-drop gesture is received as the authorizing key. The authorizing key is matched with the authorizing passcode stored in the memory. Upon matching the authorizing key with the authorizing passcode, access to the app is authorized.

In an embodiment, the authorizing key fails to match with the authorizing passcode if there is a mismatch in the direction of movement for selecting the first nodes. For instance, in the example above, if the first node with value '5' 510 was selected and dragged in the counter clockwise direction (indicated by arrow 'b') and dropped at the drop zone 522, the authorization key would mismatch with the authorization passcode. Hence the combination of the value of the first node and the associated direction of movement for selecting the first node is a criterion for matching the authorizing passcode and the authorizing key.

Figure 5B:
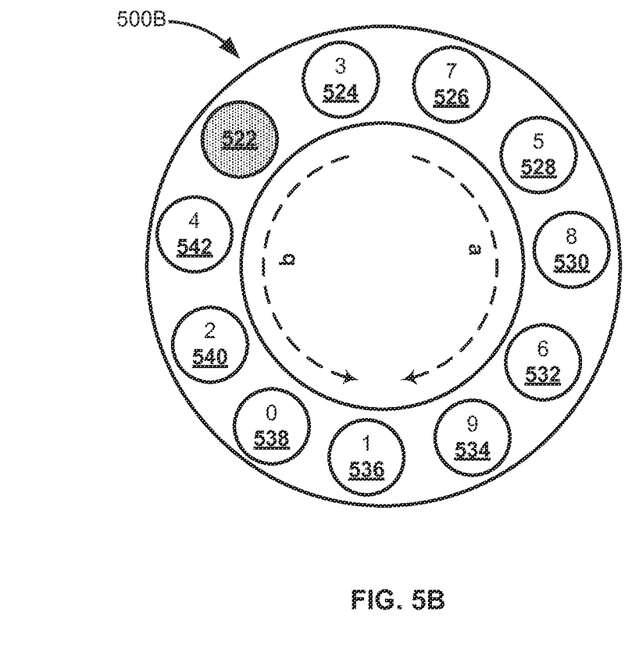
FIG. 5B is an exemplary illustration of a user interface rendering a rotary dial pattern with a second instance of arrangement of first nodes and second node, according to an embodiment.

FIG. 5B is an exemplary illustration of a user interface rendering a rotary dial pattern with a second instance of arrangement of first nodes and second node, according to an embodiment. In an embodiment, consider the authorizing passcode for an app 140 that is stored in the memory of the mobile device 105 to be '3180'. FIG. 5B shows the rotary dial pattern 500B with an instance of arrangement of the first nodes 524, 526, 528, 530, 532, 534, 536, 538, 540 and 542 and the second node 522. A first node with value '3' is configured with clockwise direction of movement; a first node with value '1' is configured with counter clockwise direction of movement; a first node with value '8' is configured with counter clockwise direction of movement, and a first node with value '0' is configured with clockwise direction of movement. To enter the authorizing key for accessing the app, the user selects a first node with value '3' 524, drags it in clockwise direction along the rotary dial (indicated by arrow 'a') and drops it at the drop zone 522. Subsequently, a first node with value '1' 536 is selected, dragged in counter clockwise direction along the rotary dial (indicated by arrow '6') and dropped at the drop zone 522; a first node with value '8' 530 is selected, dragged in counter clockwise direction (indicated by arrow 'b') and dropped at the drop zone 522; a first node with value '0' 538 is selected, dragged in clockwise direction (indicated by arrow 'a') and dropped at the drop zone 522. The user selection of the first nodes 524, 536, 530, and 538 by the drag-and-drop gesture, as explained above, is received as the authorizing key. The authorizing key is matched with the authorizing passcode, as explained in detailed description of FIG. 5A, to authorize access to the application.

Figure 6A:
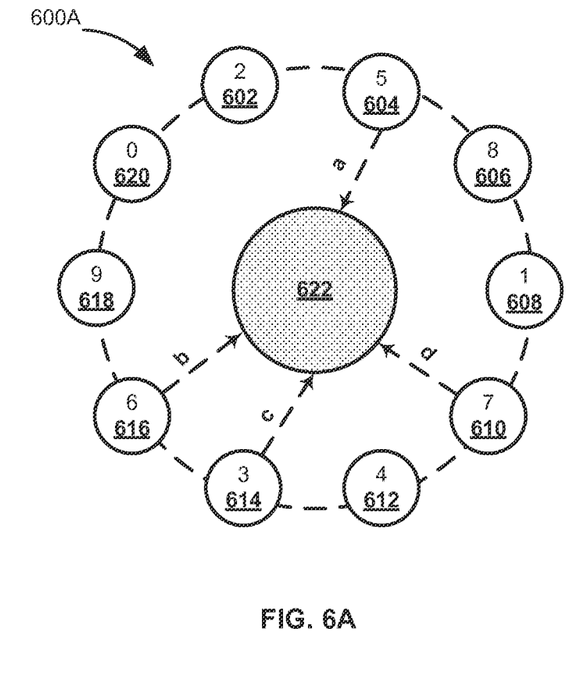
FIG. 6A is an exemplary illustration of a user interface rendering a circular pattern with a first instance of first nodes and second node, according to an embodiment.

FIG. 6A is an exemplary illustration of a user interface rendering a circular pattern with a first instance of first nodes and second node, according to an embodiment. Upon receiving a trigger to access an app 155, a circular pattern 600A is rendered as the geometrical pattern on the user interface (UI) 185. The rendered circular pattern 600A includes a first instance of an arrangement of a first set of nodes including a plurality of first nodes 602, 604, 606, 608, 610, 612, 614, 616, 618 and 620 along a periphery of the circle and a second set of nodes including a second node 622 positioned at the center circle, all as shown FIG. 6A. The first nodes are correspondingly associated with a numeric value and the second node is associated with a drop zone. The input type corresponding to the circular pattern 600A includes a drag-and-drop gesture. A drag gesture of the drag-and-drop gesture enables selecting the first nodes on the UI 185 via a touch screen 180 of the mobile device 105 and a drop gesture enables dropping the selected first nodes at the drop zone 622. The drag-and-drop gesture of the selection of the first nodes is received as an authorizing key. The authorizing key is matched with an authorizing passcode stored in the memory of the mobile device. On matching the authorizing key with the authorizing passcode, the access to the app is authorized.

For instance, consider the authorizing passcode for an app 155 stored in the memory of the mobile device 105 to be '56673'. To enter the authorizing key to access the app 155, a user selects a first node with value '5' 604 on the UI 185 via the touch screen 180, drags the selected first node 604, and drops it at the drop zone 622; a first node with value '6' 616 is selected, dragged and dropped at the drop zone 622; subsequently first nodes with values '6' 616, '7' 610, '3' 614 are sequentially selected, dragged from their current location and dropped at the drop zone 622. The user selection of the above first nodes are shown in FIG. 6A, by arrows a, b, c and d. The drag-and-drop gesture of the selection of the first nodes 604, 616, 616, 610, and 614, as explained above, is received as the authorizing key. The authorizing key is matched by correlating with an authorizing passcode stored in the memory. Upon matching the authorizing key with the authorizing passcode, access to the app is authorized. In an embodiment, upon the user selection of the first node, the value of the first node is blurred until the drop gesture is completed. Upon completion of the drop gesture to drop the selected first node, the value associated with the first node re-appears on the UI 185.

Figure 6B:
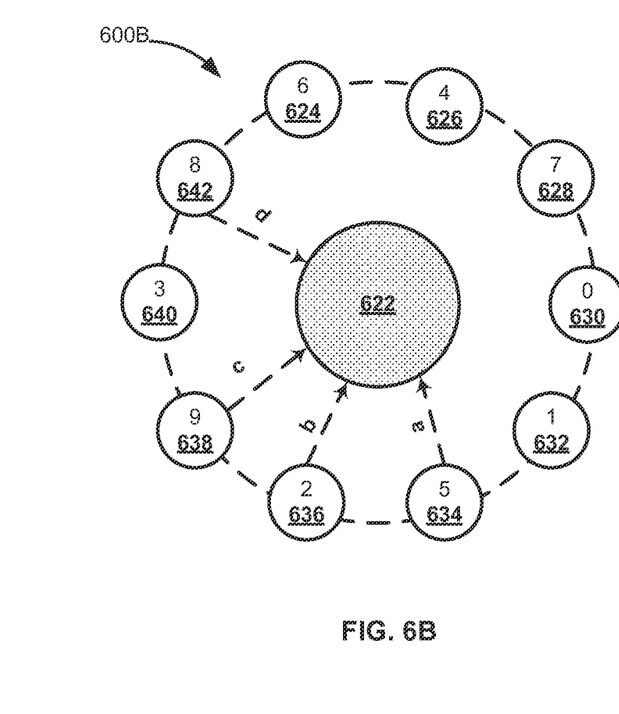
FIG. 6B is an exemplary illustration of a user interface rendering a circular pattern with a second instance of first nodes and second node, according to an embodiment.

FIG. 6B is an exemplary illustration of a user interface rendering a circular pattern with an instance of first nodes and second node, according to an embodiment. In an embodiment, consider the authorizing passcode for an app 155 that is stored in the memory of the mobile device 105 to be '5298'. FIG. 6B shows the circular pattern 600B with an instance of arrangement of the first nodes 624, 626, 628, 630, 632, 634, 636, 638, 640 and 642 and the second node 622. The input type corresponding to the circular pattern 600B includes a drag-and-drop gesture, as explained in the detailed description of FIG. 6A. To enter the authorizing key to access the app 155, a user selects a first node with value with value '5' 634 on the UI 185 via the touch screen 180, drags the first node 634 and drops it at the drop zone 622; subsequently, first nodes with values '2' 636, '9' 638 and '8' 642 are sequentially selected, dragged from their locations and dropped at the drop zone 622. The user selection of the above first nodes are shown in FIG. 6B by arrows a, b, c and d. The user selection of the first nodes 634, 636, 638 and 642 by the drag-and-drop gesture, as explained above, is received as the authorizing key. The authorizing key is matched with the authorizing passcode, as explained in detailed description of FIG. 6A, to authorize access to the application.

Figure 7A:
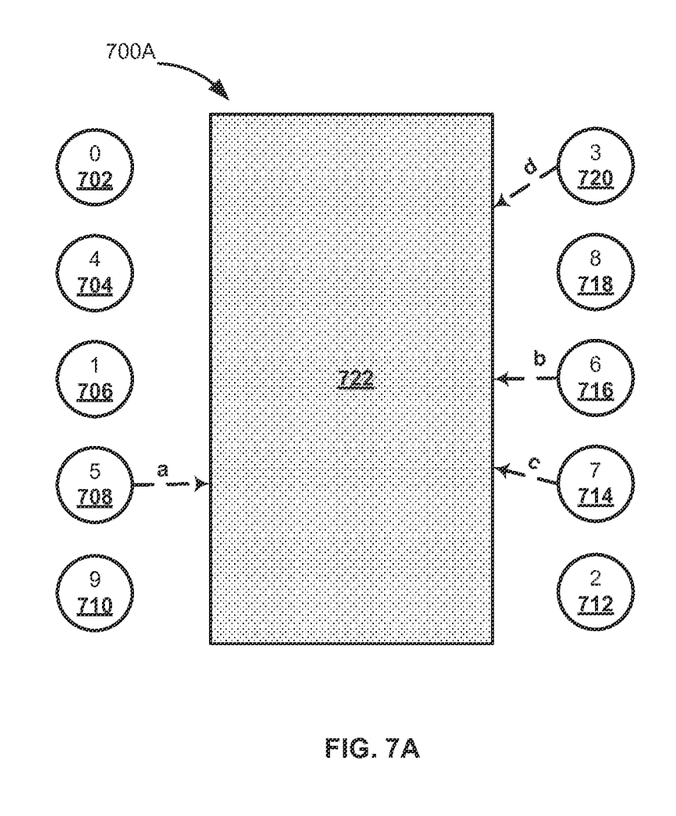
FIG. 7A is an exemplary illustration of a user interface rendering a polygon pattern with a first instance of arrangement of first nodes and second node, according to an embodiment.

FIG. 7A is an exemplary illustration of a user interface rendering a polygon pattern with a first instance of arrangement of first nodes and second node, according to an embodiment. Upon receiving a trigger to access an app 145, a polygon 700A is rendered as the geometrical pattern on the UI 185. The rendered polygon 700A includes four sides representing a four sided polygon, for example, a square, a rhombus, a rectangle, and the like. The rendered polygon 700A includes a first instance of an arrangement of a first set of nodes including a plurality of first nodes 702, 704, 706, 708, 710, 712, 714, 716, 718, and 720 and a second set of nodes including a second node 722. The first nodes are arranged along a periphery of a rectangle, and the second node is positioned at the center of the rectangle, all arranged as shown in FIG. 7A. The first nodes are correspondingly associated with a numeric value and the second node is associated with a drop zone. The input type corresponding to the rectangle geometrical pattern includes a drag-and-drop gesture. The drag gesture enables selecting the first nodes on the UI 185 via a touch screen 180 of the mobile device 105 and the drop gesture enables dropping the selected first nodes at the drop zone 722. The drag-and-drop gesture of the selection of the first nodes is received as an authorizing key. The authorizing key is matched with an authorizing passcode stored in the memory of the mobile device. On matching the authorizing key with the authorizing passcode, the access to the app is authorized. In an embodiment, the rendered polygon may include more than four sides representing the respective n-sided polygon.

For instance, consider the authorizing passcode for an app 145 that is stored in the memory of the mobile device to be '56673'. To enter an authorizing key to access the app 145, a user selects the first node with value '5' 708 via a touch screen 180, drags the selected first node 708, and drops it at the drop zone 722; subsequently first nodes with value '6' 716, '6' 716, '7' 714, and '3' 720 are sequentially selected, dragged from their current location and dropped at the drop zone 722. The user selection of the above first nodes are shown in FIG. 7A, by arrows a, b, c and d. The drag-and-drop gesture of the selection of the first nodes 708, 716, 716, 714 and 720, as explained above, is received as the authorizing key. The authorizing key is matched with an authorizing passcode stored in the memory. Upon matching the authorizing key with the authorizing passcode, access to the app is authorized. In an embodiment, upon the user selection of the first node, the value of the first node is blurred until the drop gesture is completed. Upon completion of the drop gesture to drop the selected first node, the value associated with the first node re-appears on the UI 185.

Figure 7B:
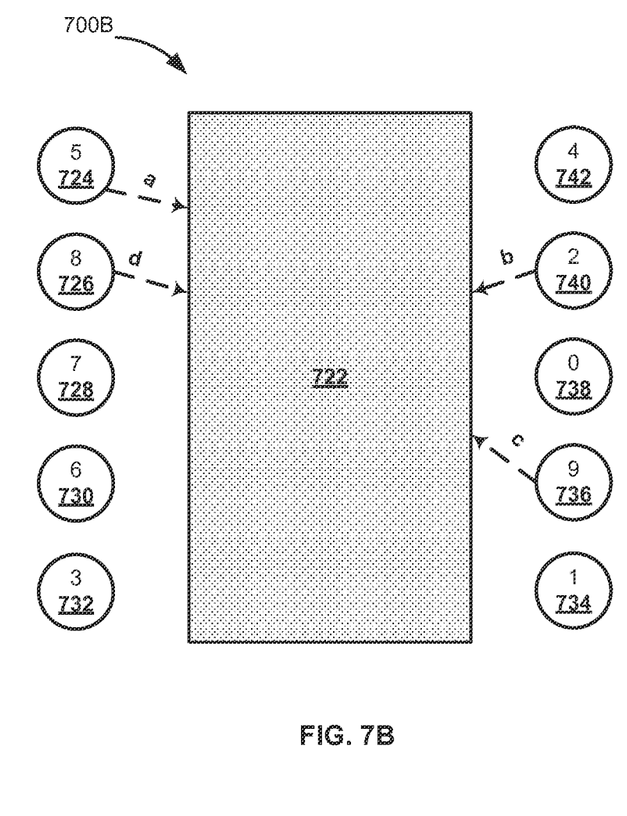
FIG. 7B is an exemplary illustration of a user interface rendering a polygon pattern with a second instance of arrangement of first nodes and second node, according to an embodiment.

FIG. 7B is an exemplary illustration of a user interface rendering a polygon pattern with an instance of arrangement of first nodes and second node, according to an embodiment. In an embodiment, the authorizing passcode for an app 115 that is stored in the memoir of the mobile device 105 may include '52298'. FIG. 7B shows the rectangular pattern 700B with an instance of arrangement of the first nodes 724, 726, 728, 730, 732, 734, 736, 738, 740 and 742 and the second node 722. To enter the authorizing key to access the app 145, a user selects the first node with value with value '5' 724 on the UI 185 via the touch screen 180, drags the selected first node 724 from their current location and drops it at the drop zone 722; subsequently, first nodes with values '2' 710, '2' 710, '9' 736, and '8' 726 are sequentially selected, dragged from their locations and dropped at the drop zone 722. The user selection of the above first nodes are shown in FIG. 7B, by arrows a, b, c and d. The user selection of the first nodes 724, 740, 740, 736 and 726 by the drag-and-drop gesture, as explained above, is received as the authorizing key. The authorizing key is matched with the authorizing passcode, as explained in detailed description of FIG. 7A, to authorize access to the application.

Figure 8:
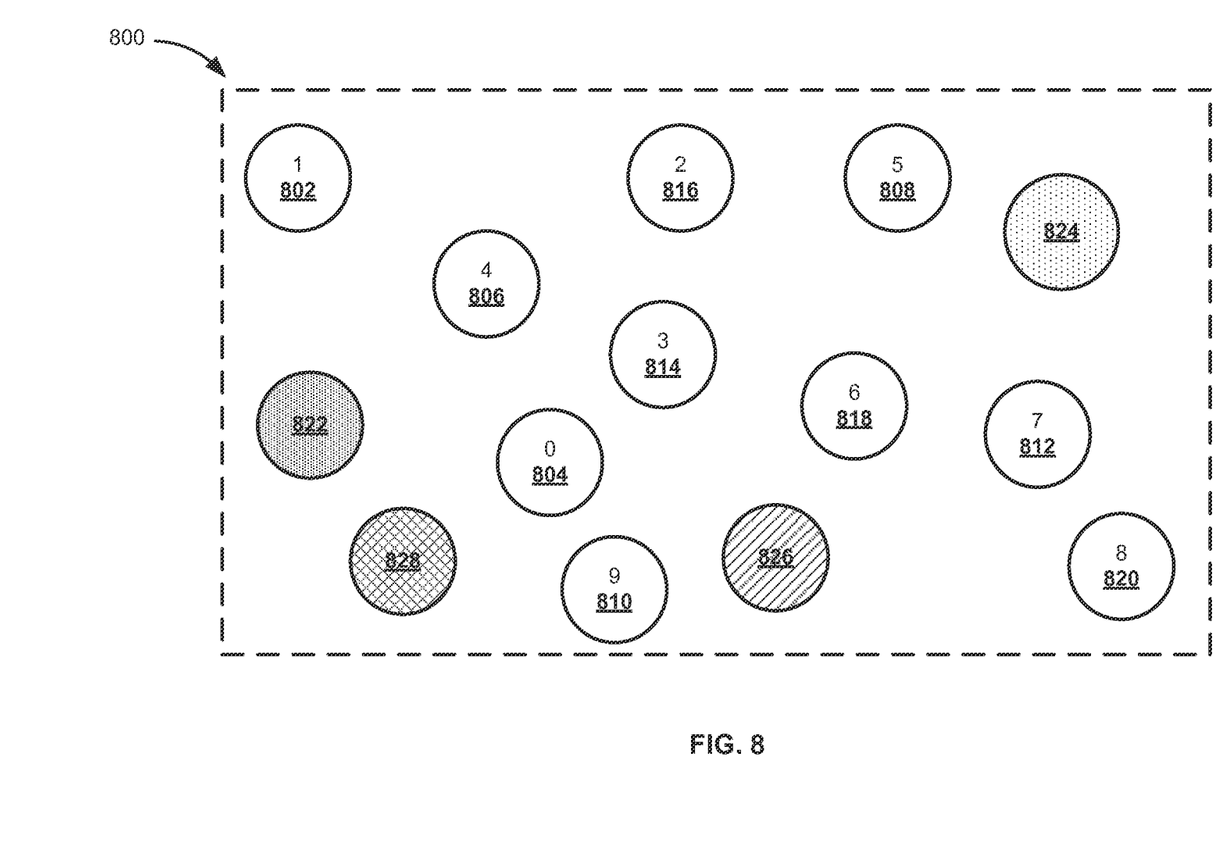
FIG. 8 is an exemplary illustration of a user interface rendering a geometrical pattern, according to an embodiment.

FIG. 8 is an exemplary illustration of a user interface rendering a geometrical pattern, according to an embodiment. Upon receiving a trigger to access an app 165, a first set of nodes including a plurality of first nodes 802, 804, 806, 808, 810, 812, 814, 816, 818, and 820 and a second set of nodes including a plurality of second nodes 822, 824, 826, and 828 configured as randomly floating bubbles are rendered as a geometrical pattern 800 on the UI 185. The arrangement of the first nodes and the second nodes as randomly floating bubbles is as shown in FIG. 8. In another embodiment, the first nodes and the second nodes may be configured as randomly floating balloons. The first nodes are correspondingly associated with a numeric value. The second nodes include a semantically distinct character, distinct patterns, colors, or a combination thereof. The input type corresponding to the bubbles pattern is a tap gesture. The tap gesture enables popping the bubbles corresponding to the first nodes and the second nodes. A user selects a combination of the first nodes and the second nodes by popping the corresponding bubbles. The popping of bubbles corresponding to the first nodes and the second nodes is received as the authorizing key. The authorizing key is matched with an authorizing passcode stored in the memory. Upon matching the authorizing key with the authorizing passcode, access to the app is authorized.

For instance, consider the authorizing passcode for an app 165 that is stored in the memory of the mobile device 105 is '56673'. To enter the authorizing key to access the app 165, the user pops the bubble corresponding to the second node 826; the popping of the bubble corresponding to the second node 826 indicates the beginning of selection of the first nodes to receive the authorizing key. Subsequently the user selects the first node with value '5' 808 by popping the corresponding bubble. In a similar manner, the user selects the first nodes with values '6' 818, '6' 818, '7' 812 and '3' 814 by popping the corresponding bubbles. The user ends the selection of the first nodes 808, 818, 818, 812, and 814 by popping the bubble corresponding to the second node 824. The popping of the bubbles corresponding to the first nodes 808, 818, 818, 812, 814 and the second nodes 826, 824 is received as the authorizing key. The authorizing key is matched with an authorizing passcode stored in the memory. Upon matching the authorizing key with the authorizing passcode, access to the app is authorized. In an embodiment, the user selects the first nodes by popping the corresponding bubble. The popped bubble re-appears and floats randomly on the UI 185. In an embodiment, the user can repeat selection of the value of the first nodes by popping the corresponding bubble several times; the corresponding bubbles re-appear and randomly float on the UI 185.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
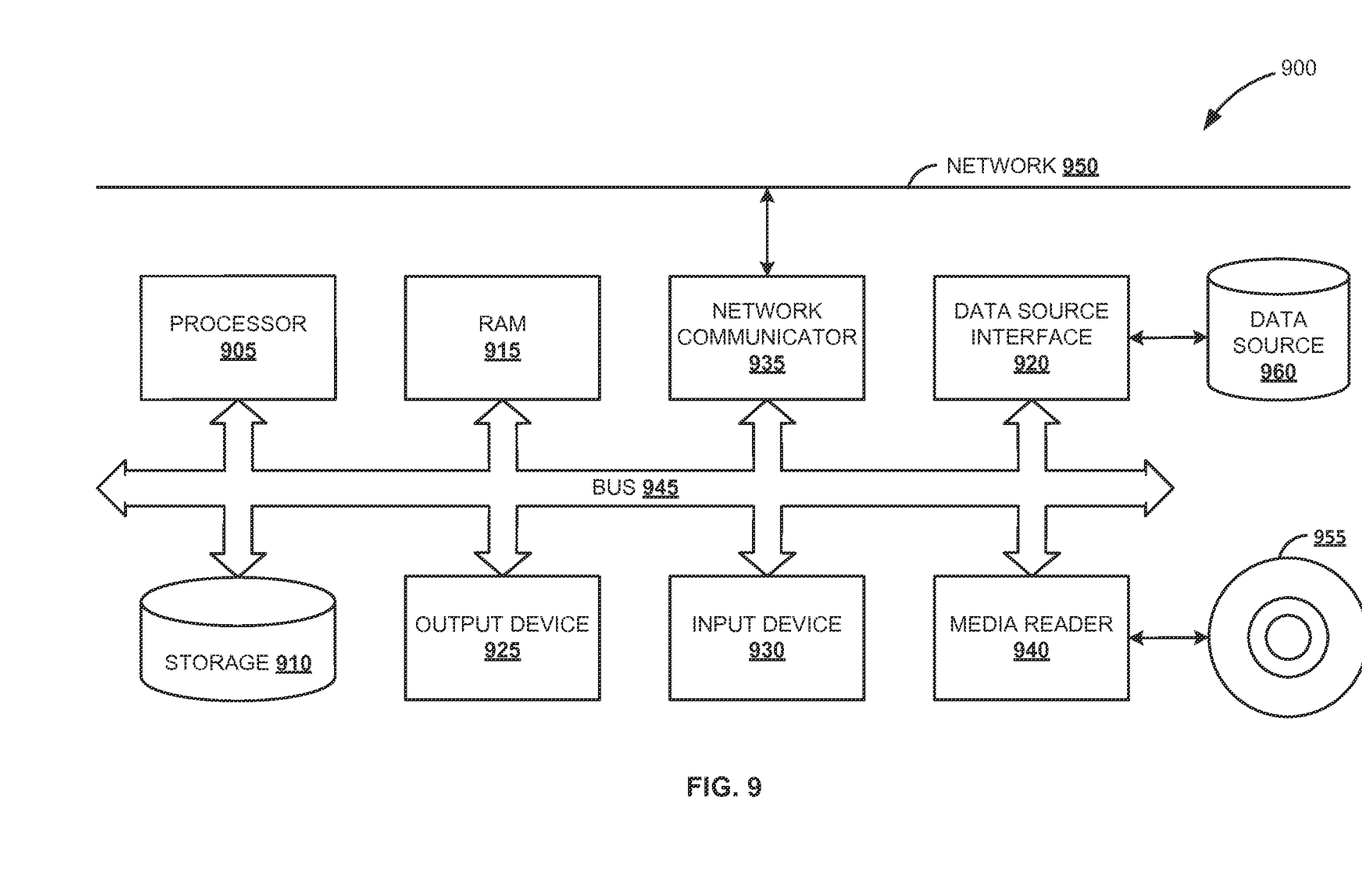
FIG. 9 is a block diagram of an exemplary computer system.

FIG. 9 is a block diagram of an exemplary computer system 900. The computer system 900 includes a processor 905 that executes software instructions or code stored on a computer readable storage medium 955 to perform the above-illustrated methods. The processor 905 can include a plurality of cores. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, all of the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to authorize an access to an application, comprising:
   a processor of a computer, generating a plurality of geometrical patterns including a plurality of instances of arrangements of one or more first nodes, and one or more second nodes, wherein the plurality of geometric patterns are associated with a plurality of input types;
   upon receiving a trigger to access the application, rendering at least one geometrical pattern and at least one instance of the one or more first nodes and the one or more second nodes corresponding to the rendered at least one geometrical pattern, on a user interface, wherein the at least one geometrical pattern comprises an arrangement of the one or more first nodes and at least one second node from the one or more second nodes as a rotary dial;
   based on an input type associated with the rendered at least one geometrical pattern, receiving a selection of the one or more first nodes and the at least one second node from the one or more second nodes as an authorizing key, wherein the input type associated with the rendered rotary dial, comprises: a drag gesture to select the one or more first nodes, wherein the drag gesture is associated with a first direction and a second direction of movement, to drop the selected one or more first nodes at a drop zone, via a drop gesture; and
   upon receiving the selection, authorizing the access to the application by matching the authorizing key with an authorizing passcode stored in a memory of the computer.

2. The computer implemented method of claim 1, wherein the rendered at least one geometrical pattern further comprises:
   an arrangement of the one or more first nodes as one or more vertices of a polygon; and
   positioning the at least one second node to be accessible from the one or more first nodes.

3. The computer implemented method of claim 2, wherein the input type associated with the rendered polygon comprises: a swipe gesture to select the one or more first nodes and the at least one second node, wherein the selection of the at least one second node enables repeating the selection of the one or more first nodes in succession.

4. The computer implemented method of claim 2, wherein the one or more first nodes are associated with a numeric value and the at least one second node is associated with a NULL value.

5. The computer implemented method of claim 1, wherein in the rendered rotary dial, the one or more first nodes are associated with a numeric value and the at least one second node is associated with the drop zone.

6. The computer implemented method of claim 1, wherein the rendered at least one geometrical pattern further comprises: an arrangement of the one or more first nodes in a circular pattern and at least one second node at center of the circular pattern.

7. The computer implemented method of claim 1, wherein the rendered at least one geometrical arrangement further comprises: an arrangement of the one or more first nodes in a rectangular pattern and at least one second node at center of the rectangular pattern.

8. The computer implemented method of claim 1, wherein the rendered at least one geometrical arrangement further comprises: an arrangement of the one or more first nodes and the one or more second nodes configured as one or more bubbles to randomly float on the user interface.

9. The computer implemented method of claim 8, wherein the input type associated with the one or more bubbles comprises: a tap gesture to pop the one or more bubbles corresponding to the one or more first nodes and the one or more second nodes, indicating the selection of the one or more first nodes and the one or more second nodes.

10. The computer implemented method of claim 8, wherein the one or more first nodes are associated with a numeric value and the one or more second nodes are associated with one or more distinct patterns.

11. The computer implemented method of claim 8, wherein the tap gesture to pop the one or more bubbles associated with the one or more second nodes indicates a beginning of the selection of the one or more first nodes, and an end of the selection of the one or more first nodes.

12. A computer implemented system to authorize an access to an application, comprising:
- a processor operable to read and execute instructions stored in one or more memory elements;
- the one or more memory elements storing instructions related to:
  - generating a plurality of geometrical patterns including a plurality of instances of arrangements of one or more first nodes, and one or more second nodes, wherein the plurality of geometrical patterns are associated with a plurality of input types;
  - an output device to render at least one geometrical pattern and at least one instance of the one or more first nodes and the one or more second nodes corresponding to the rendered at least one geometrical pattern, on a user interface, wherein the at least one geometrical pattern comprises an arrangement of the one or more first nodes and at least one second node from the one or more second nodes as a rotary dial;
  - a user input device to select the one or more first nodes and the one or more second nodes as an authorizing key, wherein the input type associated with the rendered rotary dial, comprises: a drag gesture to select the one or more first nodes, wherein the drag gesture is associated with a first direction and a second direction of movement, to drop the selected one or more first nodes at a drop zone, via a drop gesture; and
  - the processor to authorize the access to the application by matching the authorizing key with an authorizing passcode stored in memory.

13. An article of manufacture including a non-transitory computer readable storage medium to tangibly store instructions, which when executed by a computer, cause the computer to:
- generate a plurality of geometrical patterns including a plurality of instances of arrangements of one or more first nodes, and one or more second nodes, wherein the plurality of geometric patterns are associated with a plurality of input types;
- upon receiving a trigger to access the application, render at least one geometrical pattern and at least one instance of the one or more first nodes and the one or more second nodes corresponding to the rendered geometrical pattern, on a user interface, wherein the at least one geometrical pattern comprises an arrangement of the one or more first nodes and at least one second node from the one or more second nodes as a rotary dial;
- based on an input type associated with the rendered at least one geometrical pattern, receive a selection of the one or more first nodes and the at least one second node from the one or more second nodes as an authorizing key, wherein the input type associated with the rendered rotary dial, comprises: a drag gesture, to select the one or more first nodes, wherein the drag gesture is associated with a first direction and a second direction of movement, to drop the selected one or more first nodes at a drop zone, via a drop gesture; and
- upon receiving the selection, authorize the access to the application by matching the authorizing key with an authorizing passcode stored in memory.

14. The article of manufacture of claim 13, wherein the rendered at least one geometrical pattern comprises:
- an arrangement of the one or more first nodes as one or more vertices of a decagon; and
- positioning at least one second node to be accessible from the one or more first nodes.

15. The article of manufacture of claim 13, wherein the rendered at least one geometrical pattern further comprises: an arrangement of the one or more first nodes in a circular pattern and at least one second node at center of the circular pattern.

16. The article of manufacture of claim 13, wherein the rendered at least one geometrical arrangement further comprises: an arrangement of the one or more first nodes and the one or more second nodes configured as one or more bubbles to randomly float on the user interface.

17. The article of manufacture of claim 16, wherein the input type associated with the one or more bubbles includes: a tap gesture to pop the one or more bubbles associated with the one or more second nodes indicating a beginning of the selection of the one or more first nodes, and an end of the selection of the one or more first nodes.

\* \* \* \* \*